2,897,197
Patented July 28, 1959

2,897,197
PREPARATION OF 7,11-DIKETO-STEROIDS

John M. Chemerda, Metuchen, N.J., assignor to Merck & Co., Inc., Rahway, N.J., a corporation of New Jersey No Drawing. Original application August 3, 1951, Serial No. 240,281, now Patent No. 2,749,337, dated June 5, 1956. Divided and this application October 5, 1953, Serial No. 384,317

9 Claims. (Cl. 260—239.55)

This invention is concerned generally with steroid compounds having an oxygen atom attached to the carbon atom in the 11-position of the molecule. More particularly, it relates to 7-keto-11-(keto, hydroxy or acyloxy) - cyclopentanopolyhydrophenanthrene compounds, and with processes for preparing these compounds starting with the corresponding $\Delta^{8(9)}$-7-keto-11-(hydroxy, bromo or acyloxy)-cyclopentanopolyhydrophenanthrene compound. The 7-keto-11-(keto, hydroxy or acyloxy)-cyclopentanopolyhydrophenanthrene compounds thus obtained are valuable as intermediates in the synthesis of steroid hormones having an oxygen atom attached to the 11-carbon atom, such as the adrenal hormones corticosterone, cortisone and Compound F.

This application is a division of my co-pending application, Serial No. 240,281, filed August 3, 1951, now Patent No. 2,749,337, issued June 5, 1956.

The 7-keto-11-(keto, hydroxy or acyloxy)-cyclopentanopolyhydrophenanthrene compounds subject of the present invention have at rings B and C the following chemical structure:

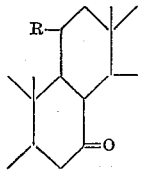

wherein R represents a keto, hydroxy or acyloxy substituent.

These 7-keto-11-(keto, hydroxy or acyloxy)-cyclopentanopolyhydrophenanthrene compounds can be prepared as follows: A $\Delta^{8(9)}$-7-keto-11-acyloxy-cyclopentanopolyhydrophenanthrene compound (Compound 1 hereinbelow) or a $\Delta^{8(9)}$-7-keto-11-hydoxy-cyclopentanopolyhydrophenanthrene compound (Compound 2) is reacted with a reducing agent thereby forming, respectively, the corresponding 7-keto-11-acyloxy-cyclopentanopolyhydrophenanthrene compound (Compound 3) or the corresponding 7-keto-11-hydroxy-cyclopentanopolyhydrophenanthrene compound (Compound 4); alternatively, if desired, the 7-keto-11-hydroxy-cyclopentanopolyhydrophenanthrene compound can be prepared by reacting the 7-keto - 11 - acyloxy - cyclopentanopolyhydrophenanthrene compound with a hydrolyzing agent; this 7-keto-11-hydroxy - cyclopentanopolyhydrophenanthrene compound (Compound 4) is then reacted with an oxidizing agent to produce the corresponding 7,11-diketo-cyclopentanopolyhydrophenanthrene compound (Compound 5); alternatively, said 7,11-diketo-cyclopentanopolyhydrophenanthrene compound can be prepared by reacting the corresponding $\Delta^{8(9)}$-7-keto-11-hydroxy-cyclopentanopolyhydrophenanthrene compound (Compound 2) with an alcoholic alkali metal hydroxide at an elevated temperature of approximately 150° C.; or if desired by reacting the corresponding $\Delta^{8(9)}$-7-keto-11-bromo-cyclopentanopolyhydrophenanthrene compound (Compound 6) with an alcoholic solution of a mineral acid.

The reactions indicated hereinabove may be chemically represented, insofar as rings B and C are concerned, as follows:

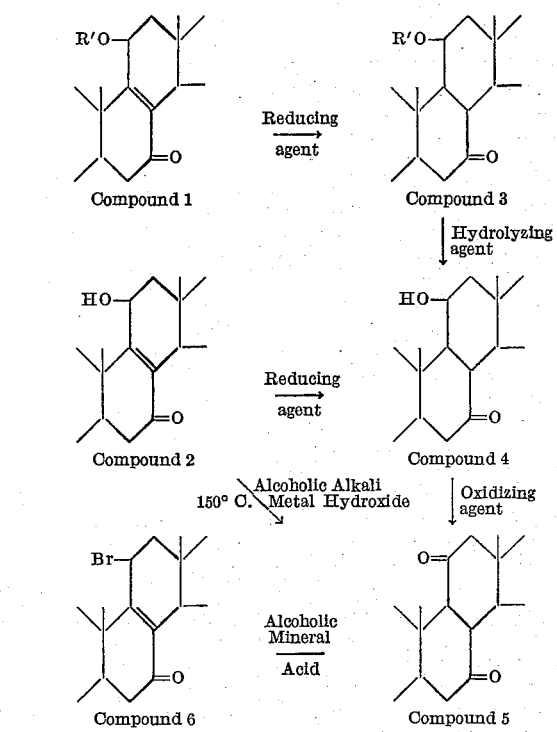

wherein R' is an acyl radical.

The $\Delta^{8(9)}$-7-keto-11-(hydroxy or acyloxy)-cyclopentanopolyhydrophenanthrene compounds which we ordinarily employ as starting materials in connection with the presently invented process are those having a sterol side chain attached to the carbon atom in the 17-position of the molecule such as $\Delta^{8(9),22}$-7-keto-11-hydroxy-ergostadiene, $\Delta^{8(9),22}$-3,11-dihydroxy-7-keto-ergostadiene, $\Delta^{8(9),22}$-3,11-diacycloxy-7-keto-ergostadiene, $\Delta^{8(9),22}$-3,11-dialkanoxy-7-keto-ergostadiene, $\Delta^{8(9),22}$-3,11-diacetoxy-7-keto-ergostadiene, $\Delta^{8(9)}$-7-keto-11-hydroxy-cholestene, $\Delta^{8(9)}$-3,11-dihydroxy-7-keto-cholestene, $\Delta^{8(9)}$-3,11-diacyloxy-7-keto-cholestene, $\Delta^{8(9)}$-3,11-dialkanoxy-7-keto-cholestene, $\Delta^{8(9)}$-3,11-diacetoxy-7-keto-cholestene, $\Delta^{8(9),22}$-3,11-dihydroxy-7-keto-stigmastadiene, $\Delta^{8(9),22}$-3,11-diacyloxy-7-keto-stigmastadiene, $\Delta^{8(9),22}$-3,11-dialkanoxy - 7 - keto-stigmastadiene, $\Delta^{8(9),22}$-3,11-diacetoxy-7-keto-stigmastadiene, a bile acid side chain attached to the 17-carbon atom such as $\Delta^{8(9)}$-3,11-dihydroxy-7-keto-cholenic acid, $\Delta^{8(9)}$-3,11-diacyloxy-7-keto-cholenic acid, $\Delta^{8(9)}$-3,11-dihydroxy-7-keto-allocholenic acid, $\Delta^{8(9)}$-3,11-diacyloxy-7-keto-allocholenic acid, a degraded bile acid side chain attached to the 17 - carbon atom such as $\Delta^{8(9)}$ - 3,11 - dihydroxy - 7- keto - bisnorcholenic acid, $\Delta^{8(9)}$ - 3,11 - diacyloxy - 7-keto-bisnorcholenic acid, $\Delta^{8(9)}$-3,11-dihydroxy-7-keto-bisnorallocholenic acid, $\Delta^{8(9)}$-3,11-diacyloxy-7-keto-bisnorallocholenic acid, a 17-carboxyl substituent such as $\Delta^{8(9)}$-7-keto-11-hydroxy-etiocholenic acid, $\Delta^{8(9)}$-3,11-dihydroxy-7-keto-etiocholenic acid, $\Delta^{8(9)}$-3,11-diacyloxy-7-keto-etiocholenic acid, $\Delta^{8(9)}$-3,11-dihydroxy-7-keto-etioallocholenic acid, $\Delta^{8(9)}$-3,11-diacyloxy-7-keto-etioallocholenic acid, a 17-acetyl substituent such as $\Delta^{8(9)}$-3,11-dihydroxy-7-keto-pregnene, $\Delta^{8(9)}$-3,11-diacyloxy-7-keto-pregnene, $\Delta^{8(9)}$-3,11-dihydroxy - 7 - keto-allopregnene, $\Delta^{8(9)}$-3,11-diacyloxy-7-keto-allopregnene, a sapogenin side chain such as $\Delta^{8(9)}$-7 - keto - 11 - hydroxy-dehydrotigogenin, $\Delta^{8(9)}$-7-keto-11- acyloxy-dehydrotigogenin acylate, $\Delta^{8(9)}$-7-keto-11-alkanoxy-dehydrotigogenin alkanoate, $\Delta^{8(9)}$-7-keto-11-acetoxy-dehydrotigogenin-acetate and the like. These starting materials can be prepared according to the procedures set forth in detail in my co-pending application Serial No. 240,052, filed August 2, 1951, now Patent No. 2,734,897, issued February 14, 1956. The $\Delta^{8(9)}$-7-keto-11-(acyloxy or hydroxy)-cyclopentanopolyhydrophenanthrene starting material is reacted with a reducing agent to produce the corresponding 7-keto-11-(acyloxy or hydroxy)-cyclopentanopolyhydrophenanthrene compound. This reduction reaction is ordinarily carried out by bringing the $\Delta^{8(9)}$-7-keto-11-(acyloxy or hydroxy)-cyclopentanopolyhydrophenanthrene compound into intimate contact with zinc dust and acetic acid or, if desired, hydrogen in the presence of a platinum catalyst. The 7-keto-11-(acyloxy or hydroxy) - cyclopentanopolyhydrophenanthrene compounds obtained according to this reduction procedure include $\Delta^{22}$ - 7 - keto-11-acyloxy-ergostene, $\Delta^{22}$-3,11-dihydroxy - 7 - keto-ergostene, $\Delta^{22}$-3,11-diacyloxy-7-keto-ergostene, $\Delta^{22}$-3,11-dialkanoxy-7-keto-ergostene, $\Delta^{22}$-3,11-diacetoxy 7-keto-ergostene, 7-keto-11-acyloxy-cholestane, 7-keto-11-hydroxy-cholestane, 3,11 - dihydroxy-7-keto-cholestane, 3,11-diacyloxy-7-keto-cholestane, 3,11-dialkanoxy-7-keto-cholestane, 3,11-diacetoxy-7-keto-cholestane, $\Delta^{22}$-3,11-dihydroxy-7-keto-stigmastene, $\Delta^{22}$-3,11-diacyloxy-7-keto-stigmastene, $\Delta^{22}$-3,11-diacetoxy-stigmastene, 3,11-dihydroxy-7-keto-cholanic acid, 3,11-diacyloxy-7-keto-cholanic acid, 3,11-dialkanoxy-7-keto-cholanic acid, 3,11-diacetoxy-7-keto-cholanic acid, 3,11-dihydroxy-7-keto-allocholanic acid, 3,11-diacyloxy-7-keto-allocholanic acids, 3,11-dihydroxy-7-keto-bisnorcholanic acid, 3,11-diacyloxy-7-keto-bisnorcholanic acid, 3,11-dialkanoxy 7-keto-bisnorcholanic acid, 3,11-diacetoxy-7-keto-bisnorcholanic acid, 3,11-dihydroxy-7-keto-bisnorallocholanic acid, 3,11-diacyloxy-7-keto-bisnorallocholanic acid, 3,11-dihydroxy-7-keto-etiocholanic acid, 3,11-diacyloxy-7-keto-etiocholanic acid, 3,11-diacetoxy-7-keto-etiocholanic acid, 3,11-dihydroxy-7-keto-etioallocholanic acid, 3,11-diacyloxy-7-keto-etioallocholanic acid, 3,11-dihydroxy-7-keto-pregnane, 3,11-diacyloxy-7-keto-pregnane, 3,11-diacetoxy-7-keto-pregnane, 3,11 - dihydroxy -7- keto-allopregnane, 3,11-diacyloxy-7-keto-allopregnane, 3,11-diacyloxy-7-keto-allopregnane, 7-keto-11-hydroxy-tigogenin, 7-keto-11-acyloxy - tigogenin acylate, 7-keto-11-alkanoxy-tigogenin alkanoate, 7-keto-11-acetoxy-tigogenin acetate, and the like.

Where the $\Delta^{8(9)}$-7-keto-cyclopentanopolyhydrophenanthrene compound utilized as starting material in the reduction procedure described hereinabove contains an acyloxy substituent in the 11-position thereby producing the corresponding $\Delta^{8(9)}$-7-keto-11-acyloxy-cyclopentanopolyhydrophenanthrene, this latter compound can be converted to the corresponding 7-keto-11-hydroxy-cyclopentanopolyhydrophenanthrene compound, if desired, by reaction with a hydrolyzing agent. We ordinarily utilize as the hydrolyzing agent in carrying out this reaction, an alcoholic solution of an alkali metal hydroxide such as ethanolic potassium hydroxide, methanolic potassium hydroxide, methanolic sodium hydroxide, and the like.

The 7 - keto - 11 - hydroxy - cyclopentanopolyhydrophenanthrene compound is then reacted with an oxidizing agent, such as chromic acid, thereby forming the corresponding 7,11 - diketo - cyclopentanopolyhydrophenanthrene compound. This oxidation reaction, where chromic acid is used as the oxidation agent is conveniently conducted by dissolving 7 - keto - 11 - hydroxy - cyclopentanopolyhydrophenanthrene compound in an organic solvent substantially inert to chromic acid such as acetone, adding to the resulting solution a solution containing chromic acid dissolved in aqueous sulfuric acid, and allowing the mixture to react substantially at room temperature for a period of approximately one hour. In accordance with this procedure, there is obtained the desired 7,11-diketo-cyclopentanopolyhydrophenanthrene compound such as $\Delta^{22}$ - 7,11 - diketo - ergostene, $\Delta^{22}$ - 3 - acyloxy - 7,11 - diketo - ergostene, $\Delta^{22}$ - 3 - acetoxy - 7,11-diketo - ergostene, $\Delta^{22}$ - 3 - hydroxy - 7,11 - diketo-ergostene, 7,11 - diketo - cholestane, 3 - acyloxy - 7,11-diketo - cholestane, 3 - acetoxy - 7,11 - diketo - cholestane, 3 - hydroxy - 7,11 - diketo - cholestane, $\Delta^{22}$ - 3 - hydroxy-7,11 - diketo - stigmastene, $\Delta^{22}$ - 3 acyloxy - 7,11 - diketo-stigmastene, $\Delta^{22}$ - 3 - acetoxy - 7,11 - diketo - stigmastene, 3 - hydroxy - 7,11 - diketo - cholanic acid, 3 - acyloxy-7,11 - diketo - cholanic acid, 3 - acetoxy - 7,11 - diketo-cholanic acid, 3 - hydroxy - 7,11 - diketo - allocholanic acid, 3 - acyloxy - 7,11 - diketo - allocholanic acid, 3-acetoxy - 7,11 - diketo - allocholanic acid, 3 - hydroxy-7,11 - diketo - bisnorcholanic acid, 3 - acyloxy - 7,11-diketo - bisnorcholanic acid, 3 - hydroxy - 7,11 - diketo-bisnorallocholanic acid, 3 - acyloxy - 7,11 - diketo - bisnorallocholanic acid, 3 - hydroxy - 7,11 - diketo - etiocholanic acid, 3 - acyloxy - 7,11 - diketo - etiocholanic acid, 3 - acetoxy - 7,11 - diketo - etiocholanic acid, 3 - hydroxy - 7,11 - diketo - etioallocholanic acid, 3 - acyloxy-7,11 - diketo - etioallocholanic acid, 3 - hydroxy - 7,11-diketo - pregnane, 3 - acyloxy - 7,11 - diketo - pregnane, 3 - hydroxy - 7,11 - diketo - allopregnane, 3 - acyloxy-7,11 - diketo - allopregnane, 7,11 - diketo - tigogenin, 7,11 - diketo - tigogenin acylate, 7,11 - diketo - tigogenin alkanoate, 7,11 - diketo - tigogenin acetate, and the like.

Alternatively, these 7,11 - diketo - cyclopentanopolyhydrophenanthrene compounds can be prepared by heating the corresponding $\Delta^{8(9)}$ - 7 - keto - 11 - hydroxy - cyclopentanopolyhydrophenanthrene compound with an alcoholic solution of an alkali metal hydroxide at an elevated temperature. It will be noted that this reaction involves the rearrangement of the hydrogen atoms attached respectively to the C–11-carbon atom and to the oxygen of the 11-hydroxy substituent to the carbon atoms in the 8 and 9-positions thereby saturating the $\Delta^{8(9)}$-double bond. It is ordinarily preferred to conduct this reaction by heating the $\Delta^{8(9)}$ - 7 - keto - 11 - hydroxy - cyclopentanopolyhydrophenanthrene compound with the alcoholic solution of an alkali metal hydroxide such as ethanolic potassium hydroxide, methanolic potassium hydroxide, methanolic sodium hydroxide, and the like, at a temperature of approximately 150° C. At this temperature the reaction is ordinarily substantially complete after a heating period of approximately eight hours.

Instead of utilizing $\Delta^{8(9)}$ - 7 - keto - 11 - (acyloxy or hydroxy) - cyclopentanopolyhydrophenanthrene compounds as starting materials for the preparation of the desired 7,11-diketo-cyclopentanopolyhydrophenanthrene compounds, we employ, instead, the corresponding $\Delta^{8(9)}$-7 - keto - 11 - bromo - cyclopentanopolyhydrophenanthrene compound, such as $\Delta^{8(9),22}$ - 7 - keto - 11 - bromo-ergostadiene, $\Delta^{8(9),22}$ - 3 - hydroxy - 7 - keto - 11 - bromo-ergostadiene, $\Delta^{8(9),22}$ - 3 - acyloxy - 7 - keto - 11 - bromo-ergostadiene, $\Delta^{8(9),22}$ - 3 - alkanoxy - 7 - keto - 11 - bromo-ergostadiene, $\Delta^{8(9),22}$ - 3 - acetoxy - 7 - keto - 11 - bromo-ergostadiene, $\Delta^{8(9)}$ -7 - keto - 11 - bromo - cholestene, $\Delta^{8(9)}$ - 3 - hydroxy - 7 - keto - 11 - bromo - cholestene, $\Delta^{8(9)}$ - 3 - acyloxy - 7 - keto - 11 - bromo - cholestene, $\Delta^{8(9)}$ - 3 - alkanoxy - 7 - keto - 11 - bromo - cholestene, $\Delta^{8(9)}$ - 3 - acetoxy - 7 - keto - 11 - bromo - cholestene, $\Delta^{8(9),22}$ - 3 - hydroxy - 7 - keto - 11 - bromo - stigmastadiene, $\Delta^{8(9),22}$ - 3 - acyloxy - 7 - keto - 11 - bromo - stigmastadiene, $\Delta^{8(9),22}$ - 3 - alkanoxy - 7 - keto - 11 - bromo-stigmastadiene, $\Delta^{8(9),22}$ - 3 - alkanoxy - 7 - keto - 11 - bromo - stigmastadiene, $\Delta^{8(9),22}$ - 3 - acetoxy - 7 - keto - 11-bromo - stigmastadiene, $\Delta^{8(9)}$ - 3 - hydroxy - 7 - keto - 11-bromo - cholenic acid, $\Delta^{8(9)}$ - 3 - acyloxy - 7 - keto - 11-bromo - cholenic acid, $\Delta^{8(9)}$ - 3 - hydroxy - 7 - keto - 11-bromo - allocholenic acid, $\Delta^{8(9)}$ - 3 - acyloxy - 7 - keto-11 - bromo - allocholenic acid, $\Delta^{8(9)}$ - 3 - hydroxy - 7-keto - 11 - bromo - bisnorcholenic acid, $\Delta^{8(9)}$ - 3 - acyloxy-7 - keto - 11 - bromo - bisnorcholenic acid, $\Delta^{8(9)}$ - 3 - hydroxy - 7 - keto - 11 - bromo - bisnorallocholenic acid, $\Delta^{8(9)}$ - 3 - acyloxy - 7 - keto - 11 - bromo - bisnorallocholenic acid, $\Delta^{8(9)}$ - 3 - hydroxy - 7 - keto - 11 - bromo-etiocholenic acid, $\Delta^{8(9)}$ - 3 - acyloxy - 7 - keto - 11 - bromo-etiocholenic acid, $\Delta^{8(9)}$ - 3 - hydroxy - 7 - keto - 11 - bromo - etioallocholenic acid, $\Delta^{8(9)}$ - 3 - acyloxy - 7 - keto - 11 - bromo - etioallocholenic acid, $\Delta^{8(9)}$ - 3 - hydroxy - 7 - keto - 11 - bromo - pregnene, $\Delta^{8(9)}$ - 3 - acyloxy - 7 - keto - 11 - bromo - pregnene, $\Delta^{8(9)}$ - 3 - hydroxy - 7 - keto - 11 - bromo - allopregnene, $\Delta^{8(9)}$ - 3 - acyloxy - 7 - keto - 11 - bromo - allopregnene, $\Delta^{8(9)}$ - 7 - keto - 11 - bromo - dehydrotigogenin, $\Delta^{8(9)}$ - 7 - keto - 11 - bromo - dehydrotigogenin acylate, $\Delta^{8(9)}$ - 7 - keto - 11 - bromo - dehydrotigogenin alkanoate, $\Delta^{8(9)}$ - 7 - keto - 11 - bromo - dehydrotigogenin acetate, and the like. These compounds can be obtained by reacting N-bromosuccinimide with the corresponding $\Delta^{7,9(11)}$ - 7 - acyloxy - cyclopentanopolyhydrophenanthrene compound, which in turn, can be prepared in accordance with the procedures set forth in my copending application Serial No. 240,052, filed August 2, 1951. The $\Delta^{8(9)}$ - 7 - keto - 11 - bromo - cyclopentanopolyhydrophenanthrene compound is reacted with an alcoholic solution of a mineral acid, preferably a solution of hydrochloric acid in methanol. The reaction is conveniently carried out by heating the reactants together under reflux thereby producing the corresponding 7,11-diketo-cyclopentanopolyhydrophenanthrene compound.

The following examples illustrate methods of carrying out the present invention, but it is to be understood that these examples are given for purposes of illustration and not of limitation.

*Example 1*

One hundred milligrams of $\Delta^{8(9),22}$-3-diacetoxy-7-keto-ergostadiene (which can be prepared according to the procedure described in my co-pending application Serial No. 240,052, filed August 2, 1951), was dissolved in 5 cc. of acetic acid, 100 mg. of zinc dust was added to the solution, and the resulting mixture was heated at a temperature of 100° C. for about three hours. The reaction mixture was filtered, the filtered solution was diluted with water, and the gummy material which precipitated was extracted with benzene. The benzene was evaporated from the benzene extract to give $\Delta^{22}$-3,11-diacetoxy-7-keto-ergostene which was obtained in the form of an amorphous solid.

The $\Delta^{22}$-3,11-diacetoxy-7-keto-ergostene, prepared as described hereinabove, was dissolved in 5 cc. of a 5% solution of sodium hydroxide in methanol and the resulting solution was heated under reflux for a period of approximately one hour. The reaction solution was diluted with water and the gummy material which precipitated was recovered by decantation, washed and dried to give $\Delta^{22}$-3,11-dihydroxy-7-keto-ergostene in the form of an amorphous solid.

The $\Delta^{22}$-3,11-dihydroxy-7-keto-ergostene, prepared as described hereinabove, was dissolved in 5 cc. of acetone, and a solution containing 7 mg. of chromic acid dissolved in 1 cc. of 2 N aqueous sulfuric acid solution was added to the acetone solution. The resulting mixture was allowed to stand at room temperature for a period of about twenty minutes, the solvents were evaporated from the reaction solution in vacuo, and the residual material was extracted with ether. The ethereal extract was chromatographed over acid-washed alumina to give substantially pure $\Delta^{22}$-3-hydroxy-7,11-diketo-ergostene; M.P. 199–200° C.

*Example 2*

One hundred milligrams of $\Delta^{8(9),22}$-3,11-dihydroxy-7-keto-ergostadiene were dissolved in 15 cc. of alcohol, 20 mg. of platinum oxide catalyst were added to the solution, and the resulting mixture was subjected to the action of hydrogen at a pressure of one atmosphere until one molecular equivalent of hydrogen had been absorbed. The reaction mixture was filtered, thereby removing the catalyst, and the filtered solution was evaporated in vacuo to give $\Delta^{22}$-3,11-dihydroxy-7-keto-ergostene which was obtained as an amorphous solid.

The $\Delta^{22}$-3,11-dihydroxy-7-keto-ergostene, prepared as described in the preceding paragraph, was dissolved in 10 cc. of acetone, and a solution containing 7 mg. of chromic acid dissolved in 1 cc. of a 2 N aqueous solution of sulfuric acid was added to the acetone solution. The resulting mixture was allowed to stand at room temperature for a period of about twenty minutes, the solvents were evaporated from the reaction solution in vacuo, and the residual material was extracted with ether. The ethereal extract was chromatographed over acid-washed alumina to give substantially pure $\Delta^{22}$-3-hydroxy-7,11-diketo-ergostene; M.P. 199–200° C.

*Example 3*

One hundred milligrams of $\Delta^{7,22}$-3,7-diacetoxy-9,11-epoxy-ergostadiene (which can be prepared according to the procedure described in my co-pending application Serial No. 240,052, filed August 2, 1951), were heated under reflux with 5 cc. of a 5% solution of potassium hydroxide in methanol. (The alkaline methanolic reaction solution, thus prepared, contains $\Delta^{8(9),22}$-3,11-dihydroxy-7-keto-ergostadiene which can be recovered therefrom, if desired, triturating the desidual solution with water, and filtering and drying the precipitated material.)

Instead of isolating the $\Delta^{8(9),22}$-3,11-dihydroxy-7-keto-ergostadiene, the alkaline methanolic reaction solution containing this compound was heated under pressure at a temperature of about 150° C. for a period of approximately eight hours. The reaction mixture was cooled to room temperature, water was added thereto, and the material which precipitated was recovered by filtration and purified by chromatography over acid-washed alumina to give substantially pure $\Delta^{22}$-3-hydroxy-7,11-diketo-ergostene; M.P. 198–200° C.

*Example 4*

Two hundred milligrams of $\Delta^{7,9(11),22}$-3,7-diacetoxy-ergostatriene (which can be prepared in accordance with the procedure described in my co-pending application Serial No. 240,052, filed August 2, 1951), were dissolved in 30 cc. of acetone and 280 mg. of N-bromosuccinimide and 5 cc. of water were added to the acetone solution. In a few minutes, the N-bromosuccinimide dissolved completely and a crystalline product began to separate from the solution. This material was recovered by filtration and dried to give substantially pure $\Delta^{8(9),22}$-3-acetoxy-7-keto-11-bromo-ergostadiene; M.P. 150–153° C., dec. (using a bath preheated to 120° C.) λ max. 2650 A.;

$$E_{1\,cm.}^{\%} 136$$

*Analysis.*—Calc'd for $C_{30}H_{45}O_3Br$:Br, 14.9. Found: Br, 14.1.

Two hundred milligrams of $\Delta^{8(9),22}$-3-acetoxy-7-keto-11-bromo-ergostadiene were dissolved in 30 cc. of methanol, 0.1 ml. of a 2.5 N aqueous solution of hydrochloric acid was added to the methanol solution, and the resulting solution was heated under reflux for a period of about three hours. The solvents were evaporated from the reaction solution in vacuo, and the residual material was chromatographed over acid-washed alumina to give substantially pure $\Delta^{22}$-3-hydroxy-7,11-diketoergostene; M.P. 196–198° C.

Various changes and modifications may be made in carrying out the present invention without departing from the spirit and scope thereof. Insofar as these changes and modifications are within the purview of the annexed claims, they are to be considered as part of my invention.

I claim:

1. The process which comprises reacting a 7-keto-11-acyloxy-cyclopentanopolyhydrophenanthrene compound selected from the group which consists of $\Delta^{22}$-3,11-bis(lower alkanoyloxy)-7-keto-ergostene and 7-keto-11-(lower alkanoyloxy)-tigogenin 3-(lower alkanoate) with a hydrolyzing agent comprising an alcoholic solution of an alkali metal hydroxide to produce the corresponding 7-keto - 11 - hydroxy-cyclopentanopolyhydrophenanthrene compound, and reacting said 7-keto-11-hydroxy-cyclopentanopolyhydrophenanthrene compound with an oxidizing agent comprising chromic acid to form the corresponding 7,11 - diketo - cyclopentanopolyhydrophenanthrene compound.

2. The process which comprises reacting $\Delta^{22}$-3,11-diacetoxy-7-keto-ergostene with methanolic sodium hydroxide to produce $\Delta^{22}$-3,11-dihydroxy-7-keto-ergostene, and reacting said $\Delta^{22}$-3,11-dihydroxy-7-keto-ergostene with chromic acid to form $\Delta^{22}$-3-hydroxy-7,11-diketo-ergostene.

3. The process which comprises reacting 7-keto-11-acetoxy-tigogenin acetate with a hydrolyzing agent comprising an alcoholic solution of an alkali metal hydroxide to produce 7-keto-11-hydroxy-tigogenin, and reacting said 7-keto-11-hydroxy-tigogenin with an oxidizing agent comprising chromic acid to form 7,11-diketo-tigogenin.

4. The process which comprises reacting a 7-keto-11-acyloxy-cyclopentanopolyhydrophenanthrene compound selected from the group with consists of $\Delta^{22}$-3,11-bis(lower alkanoyloxy)-7-keto-ergostene and 7-keto-11-(lower alkanoyloxy)-tigogenin 3-(lower alkanoate) with a hydrolyzing agent comprising an alcoholic solution of an alkali metal hydroxide to produce the corresponding 7-keto-11-hydroxy-cyclopentanopolyhydrophenanthrene compound.

5. The process which comprises reacting $\Delta^{22}$-3,11-diacetoxy-7-keto-ergostene with a methanolic solution of sodium hydroxide to produce $\Delta^{22}$-3,11-dihydroxy-7-keto-ergostene.

6. The process which comprises reacting 7-keto-11-acetoxy-tigogenin acetate with a hydrolyzing agent comprising an alcoholic solution of an alkali metal hydroxide to produce 7-keto-11-hydroxy-tigogenin.

7. The process which comprises reacting 7-keto-11-hydroxy-cyclopentanopolyhydrophenanthrene compound selected from the group which consists of $\Delta^{22}$-3,11-dihydroxy-7-keto-ergostene and 7-keto-11-hydroxy-tigogenin with an oxidizing agent comprising chromic acid to form the corresponding 7,11-diketo-cyclopentanopolyhydrophenanthrene compound.

8. The process which comprises reacting $\Delta^{22}$-3,11-dihydroxy-7-keto-ergostene with chromic acid to form $\Delta^{22}$-3-hydroxy-7,11-diketo-ergostene.

9. The process which comprises reacting 7-keto-11-hydroxy-tigogenin with chromic acid to form 7,11-diketo-tigogenin.

References Cited in the file of this patent

UNITED STATES PATENTS 2,602,769  Murray ---------------- July 8, 1952

OTHER REFERENCES

Elsevier's Encyclopedia of Organic Chemistry (1952), vol. 140, suppl., pages 1275s, 1270.